United States Patent [19]

Busche et al.

[11] Patent Number: 4,796,288

[45] Date of Patent: Jan. 3, 1989

[54] TELEPHONE HANDSET WITH STATIC DISCHARGE PREVENTION

[75] Inventors: Alan C. Busche, Dorchester; Josef Talacek, Don Mills; Ronald G. Wellard, Gloucester, all of Canada

[73] Assignee: Northern Telecom Limited, Montreal, Canada

[21] Appl. No.: 877,569

[22] Filed: Jun. 23, 1986

[51] Int. Cl.⁴ .............................................. H04M 1/04
[52] U.S. Cl. .................................. 379/433; 381/157; 381/169; 381/188
[58] Field of Search ............... 379/419, 420, 428, 429, 379/432, 433, 439, 451, 452; 381/111, 112, 113, 116, 155, 158, 159, 168, 169, 187, 191, 157, 199, 188, 205

[56] References Cited

U.S. PATENT DOCUMENTS

| | | | |
|---|---|---|---|
| 3,148,249 | 9/1964 | King | 379/345 |
| 3,243,527 | 3/1966 | Sternheim | 379/452 |
| 4,117,275 | 9/1978 | Miyanaga et al. | 381/191 X |
| 4,130,740 | 12/1978 | Cogan | 379/433 |
| 4,263,484 | 4/1981 | Hisatsune et al. | 381/189 X |
| 4,424,419 | 1/1984 | Chaput et al. | 381/157 X |
| 4,529,846 | 7/1985 | Freeman | 381/199 |
| 4,584,702 | 4/1986 | Walker, Jr. | 381/158 X |
| 4,594,478 | 6/1986 | Gumb et al. | 381/157 |
| 4,636,591 | 1/1987 | Kuhfus et al. | 381/159 |

OTHER PUBLICATIONS

"Handsets with Hand Tailored Features", Audiosears Corporation, Telephony, Jul. 11, 1970, p. 59.

*Primary Examiner*—Jin F. Ng
*Assistant Examiner*—Randall S. Vaas
*Attorney, Agent, or Firm*—Sidney T. Jelly

[57] ABSTRACT

A telephone handset with static discharge prevention has a dielectric membrane extending over the metal ferrule of the transmitter, the membrane spaced from the ferrule by an annular dielectric spacer. At the receiver, a metal shunt on the front of the receiver has a central aperture for acoustic access. An annular dielectric membrane is positioned in the aperture and a dielectric membrane extends over the aperture, dielectric member and shunt. The membrane has a small hole within the annular dielectric member. The dielectric membrane at the transmitter increases the breakdown voltage to a value which will avoid static discharge to the user. The dielectric membrane and dielectric spacer at the receiver forms a long and sinuous discharge path which raises the breakdown voltage to a value which also avoids static discharge to a user.

2 Claims, 3 Drawing Sheets

TELEPHONE HANDSET WITH STATIC DISCHARGE PREVENTION

This invention relates to the prevention of static discharge from a telephone handset, and in particular is concerned with the prevention of a static discharge to the head of a user when a handset is used.

Handsets are conventionally designed to have minimum static breakdown limits of 6,000 volts for the transmitter end and 12,000 volts for the receiver end. However, in certain environments it has been found that much higher static values have occurred on the user. An example of such an environment is in professional offices where carpets are provided and where a dry atmosphere may exist. Under certain conditions, a static discharge can occur, from the user, between the transmitter and the mouth of the user, or between the receiver and the ear of the user. The position of discharge will depend largely on which end of the handset is the first to come close to the head of the user.

It can also occur that during use a static charge can build up on the user by movement of the user. A static discharge can then occur and this could repeat. Unpleasant effects can be caused by such static discharges.

The present invention raises the minimum limit for static breakdown to 20,000 volts. There are quite serious limitations in what can be changed in handsets, as the acoustic characteristics are fairly closely defined. Thus any modifications to a handset must result in minimal changes in the characteristics of the handset. In the present invention, the transmitter end has a plurality of modifications which combine to give the desired result. Specifically, the transmitter itself is moved back a short distance from the front face of the transmitter housing. A dielectric annular spacer is positioned on the front of the transmitter and a dielectric membrane is positioned over the spacer immediately adjacent to the front face of the housing. The ferrule of the transmitter is normally grounded to the transmitter circuit. In the present invention the transmitter is one having its own grounding and the ferrule is not grounded. Finally, a zener diode is connected across the conductors to the transmitter.

At the receiver end, less modifiction is required. The receive has a metallic shunt over its front surface acting to shunt magnetic field leakage from a flux coil in the receiver. The shunt has a central aperture and the static breakdown level is increased by positioning a dielectric ring in the aperture. This tends to act as a barrier. Further, a membrane is positioned over the front face of the receiver, over the shunt. The membrane has a small aperture at its center. While the membrane does not interfere significantly with the acoustics, the discharge path has to be through the aperture and then turn sharply to be radially outward, over the ring, before meeting the shunt. Thus the path length of the static discharge is lengthened.

Thus, broadly, the invention comprises a telephone handset having a transmitter in a housing at one end and a receiver in a housing at the other end. The transmitter is spaced, at its front face, a small distance from the front face of the housing with a dielectric annular spacer and a dielectric membrane between the transmitter and the housing front face. The metal ferrule of the transmitter is ungrounded and a zener diode is positioned across the conductors to the transmitter. The receiver has a metallic shunt at its front face, the shunt having a central aperture. An annular dielectric ring is positioned in the aperture and a dielectric membrane is positioned over the front face of the receiver. A small hole is formed in the membrane within the annular ring.

The invention will be readily understood by the following description of an embodiment, in conjunction with the accompanying drawings, in which.

Figure 1:
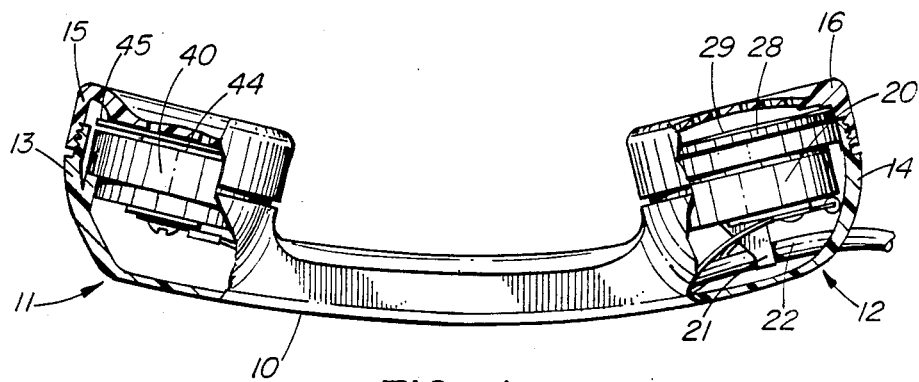
FIG. 1 is a side view of a telephone handset in accordance with the present invention, the housings at each end partly sectioned to show the transducer assemblies.

As illustrated in FIG. 1, a telephone handset 10 has a receiver housing 11 at one end and a transmitter housing 12 at the other end. Each housing has a hollow base part 13 and 14 respectively and a cap 15 and 16 respectively. In the example, the caps screw onto the base parts.

At the end having the transmitter housing 12, there is a transmitter cup 20 which fits into the hollow base part 14. On the base of the cup is a channel-shaped member 21 which engages with the handset cord 22 and acts as a strain relief.

Figure 2:
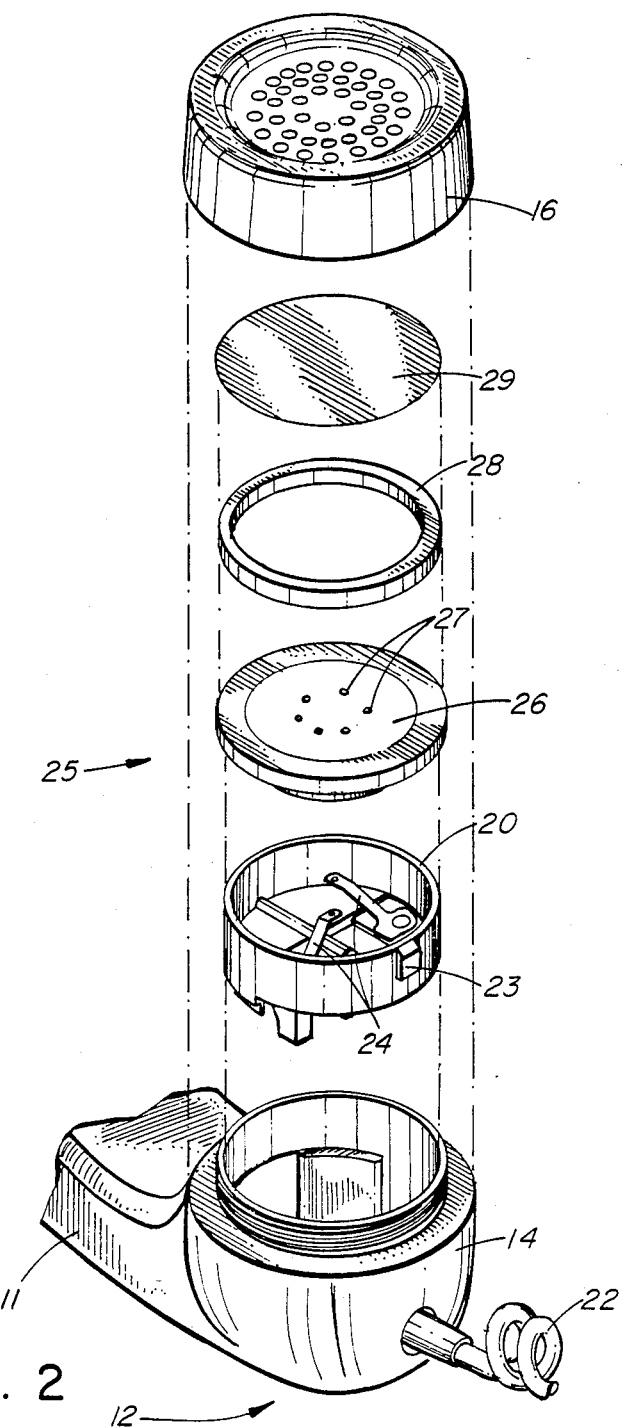
FIG. 2 is an exploded perspective view of the various items at the transmitter end of the handset.

As particularly seen also in FIG. 2, the cup 20 is positioned by ribs or similar protrusions 23. The inner bottom surface of the cup has two spring contact arms 24. Fitting inside the transmitter cup 20 is the transmitter 25. The transmitter has a dielectric body within which is mounted a transducer. A metal ferrule 26 extends over the top of the transmitter and has small holes or apertures 27 in its front suraace for acoustic connection to the transducer. The ferrule extends down the peripheral edge of the transmitter housing and is formed round and under. An annular dielectric spacer 28 rests on the ferrule 26 and a dielectric membrane 29 rests on the spacer 28. Cap 16 screws onto the base 14 and clamps the parts together.

Figure 3:
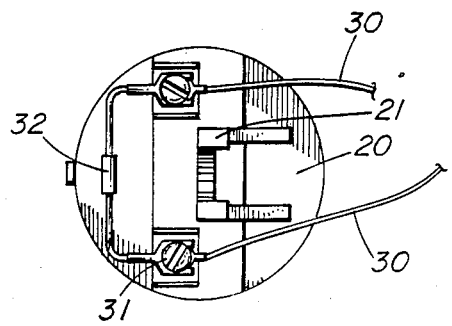
FIG. 3 is a bottom plan view of the transmitter cup of FIGS. 1 and 2.

The outer bottom surface of the transmitter cup 20 is seen in FIG. 3. The conductors 30 for the transmitter are attached by screws 31, the conductors having spade terminals at their ends. Connected across the screws 31, and thus across the conductors 30, is a zener diode 32.

Figure 4:
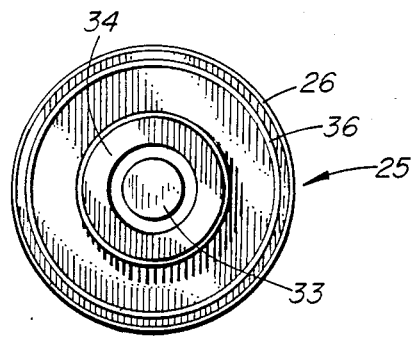
FIG. 4 is a bottom plan view of the transmitter of FIGS. 1 and 2.

FIG. 4 shows the bottom surface of the transmitter 25. A central contact 33 and an annular contact 34 make contact with the contact arms 24 which are in turn connected to the screws 31 in FIG. 3. An annular rib 36 is a close fit in the transmitter cup 20.

Figure 5:
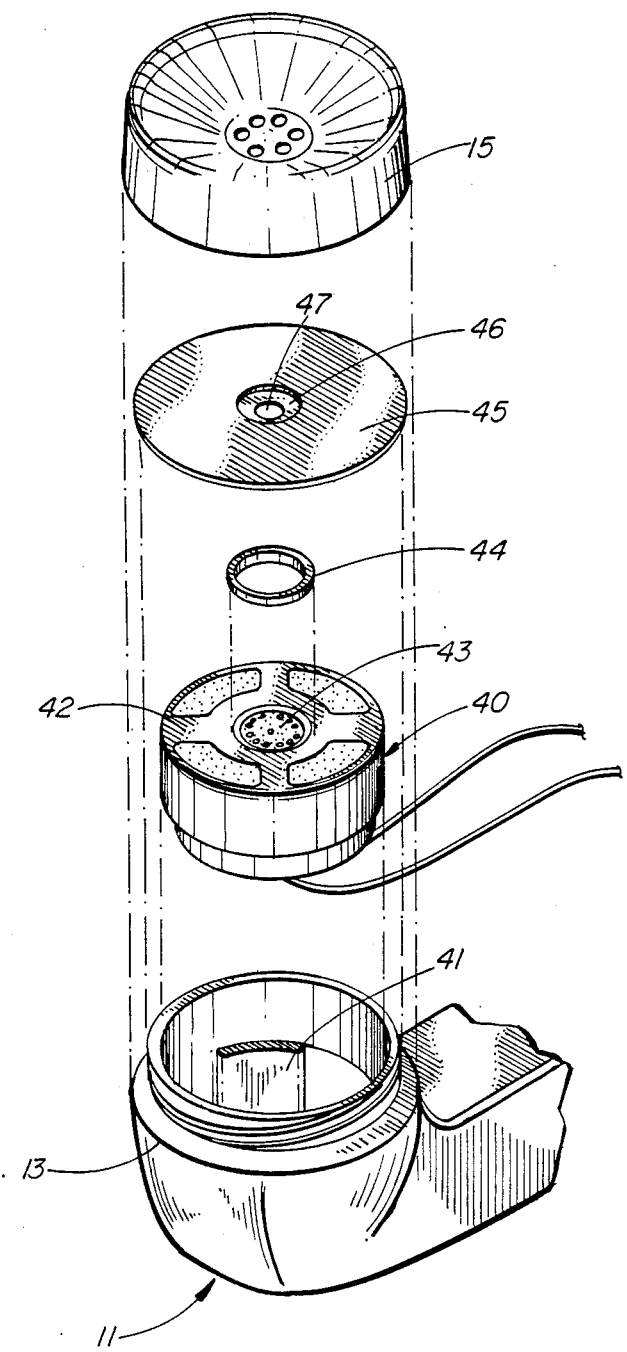
FIG. 5 is an exploded perspective view of the items at the receiver end of the handset.

FIG. 5 illustrates the receiver end 11 and the various parts relating thereto. A receiver 40 fits in the housing 13, being positioned by protrusions 41 on the inner wall of the housing. The receiver has a metallic shunt 42 extending over its front surface, an example of such a shunt being described in U.S. Pat. No. 4,529,846 issued on July 16, 1985, in the name of the present assignee. The shunt 42 has a central aperture 43 which exposes the perforations which permit acoustic entry to the receiver transducer. Fitting in the aperture 43 is an annular dielectric member 44. Extending over the aperture 43 and the shunt 42 is a dielectric membrane. In the example, the membrane is supported on a polystyrene disc, the disc being indicated at 45 and the membrane being seen through the center of the disc, at 46. The membrane is mounted on the disc on the surface adjacent to the receiver. A small hole 47 is formed at the center of the membrane. Cap 15 screws on the base 13 and holds all the parts assembled. The static discharge path is through the hole 47 and then outward past the dielectric member 44 to the shunt 42. The dielectric member 44 partially solves the static discharge problem in that it raises the breakdown voltage above conventional. Adding the membrane 46 increases the discharge or breakdown path and further increases the breakdown voltage. Breakdown voltages of about 20,000 volts can be achieved at both transmitter and receiver.

While is it envisaged that some variations, in the described and illustrated embodiment, can be made, particularly if a breakdown voltage lower than 20,000 volts is acceptable, the embodiment described gives high and consistent static discharge protection to the user.

What is claimed is:

1. A telephone handset including a transmitter housing at one end and a receiver housing at the other end, each housing having a hollow base part and a cap fitting on the base part;

said transmitter housing including a transmitter assembly comprising; a cup positioned in the hollow base part; a transmitter positioned in the cup, the transmitter including a dielectric body, a transducer within the body and a metal ferrule extending over the body and including apertures for acoustic access to the transducer; a dielectric annular spacer positioned on said ferrule on a surface remote from said transducer; and a dielectric membrane positioned on said spacer on a side remote from said ferrule and spaced therefrom and extending over said transmitter, said cup holding said dielectric membrane, said dielectric spacer and said transmitter assembly in said hollow base part of said transmitter housing;

said receiver housing including a receiver positioned in the hollow base part of the receiver housing, said receiver including a transducer; a metallic shunt extending over a front surface of the receiver, said shunt including a central aperture providing acoustic access to the receiver transducer; an annular dielectric member positioned in said aperture; a dielectric membrane extending over said aperture, said dielectric member and said shunt; and a hole formed in the center of said dielectric membrane extending over said aperture, said hole being smaller than said aperture.

2. A telephone handset including a transmitter housing at one end and a receiver housing at the other end, each housing having a hollow base part and a cap fitting on the base part;

said transmitter housing including a transmitter assembly comprising; a cup positioned in the hollow base part; a transmitter positioned in the cup, the transmitter including a dielectric body, a transducer within the body and a metal ferrule extending over the body and including apertures for acoustic access to the transducer; a dielectric annular spacer positioned on said ferrule on a surface remote from said transducer; and a dielectric membrane positioned on said spacer on a side remote from said ferrule and spaced therefrom and extending over said transmitter, said cup holding said dielectric membrane, said dielectric spacer and said transmitter assembly in said hollow base part of said transmitter housing;

said receiver housing including a receiver positioned in the hollow base part of the receiver housing, said receiver including a transducer; a metallic shunt extending over a front surface of the receiver, said shunt including a central aperture providing acoustic access to the receiver transducer; an annular dielectric member positioned in said aperture; a dielectric membrane extending over said aperture, said dielectric member and said shunt; and a hole formed in the center of said dielectric membrane extending over said aperture, said hole being smaller than said aperture; said dielectric membrane extending over said aperture, said dielectric member and said shunt being mounted on a dielectric disc, said dielectric disc having a central aperture aligned with said central aperture in said shunt, an inner peripheral edge portion at said central aperture in said dielectric disc aligned with and resting on said annular dielectric member.

* * * * *